May 5, 1959
R. H. ZINKIL
2,885,180
DIAPHRAGM VALVE
Filed Aug. 22, 1956
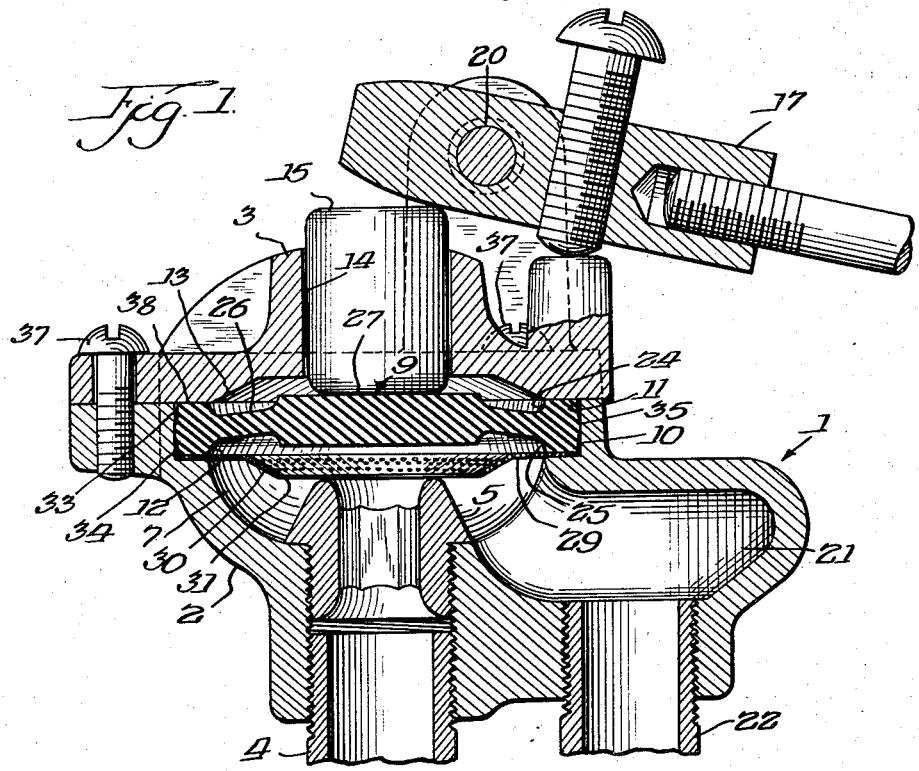
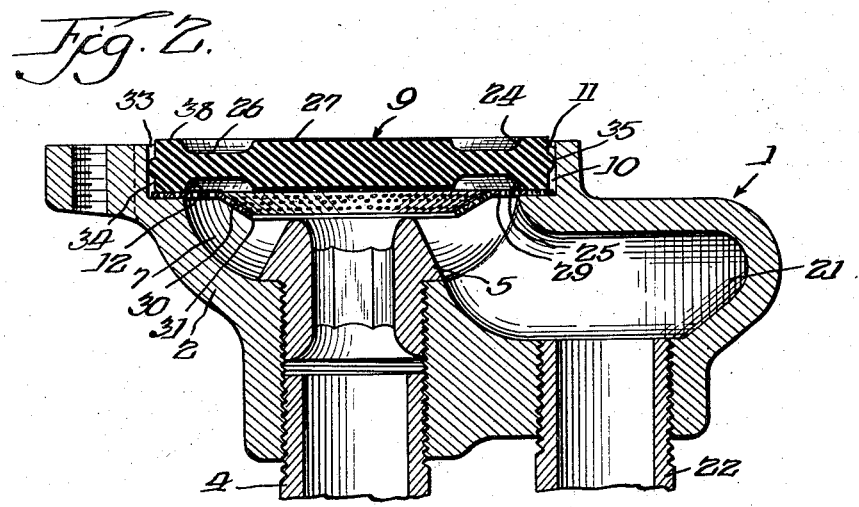
Inventor.
Roy H. Zinkil.
By Joseph O. Lange
Atty.

United States Patent Office 2,885,180
Patented May 5, 1959

2,885,180

DIAPHRAGM VALVE

Roy H. Zinkil, Oak Park, Ill., assignor to Crane Co., Chicago, Ill., a corporation of Illinois Application August 22, 1956, Serial No. 605,577

5 Claims. (Cl. 251—331)

This invention relates generally to valves, and more particularly it pertains to diaphragm type valves, especially those known as ballcocks or float actuated supply valves as for use in plumbing water closet flush tanks or the like.

It is a primary object of the invention to provide diaphragm type closure means which will not buckle or distort as a result of mounting so as to lead to objectionable chatter or dynamic vibrations or to failure to open under low inlet pressure conditions.

It has been found that chatter can take place in constructions where the flexible diaphragm is not exactly centered. A considerable amount of space is usually provided in such constructions around the diaphragm which, along with other purposes, permit the same to be loosely dropped into place within the counterbore or relief portion, which spacing allows for off-centered positioning taking place. The diaphragm is not made larger in such constructions so as to completely fill the space and fit tightly within the recess, not only to avoid the need and inconvenience of applying pressure on said diaphragm in order to force the same into position during mounting, but more significantly to provide a certain amount of peripheral space into which the diaphragm can expand or spread after clamping between the body and bonnet to eliminate any undue distortion of the diaphragm which will prevent low pressure opening of the valve or otherwise interefere with its proper function. It should of course be understood that the extent to which the diaphragm in such constructions is clamped or squeezed is relatively slight, being limited or controlled by a certain predetermined depth of the recess within which the diaphragm is received and sufficient to effect a proper fluid tight seal, the amount of squeeze being intended only to insure a fluid seal between the diaphragm and casing.

The present invention solves the difficulty present in the prior constructions by providing a relatively narrow peripheral bead or continuous flexible projection around the circumference of the diaphragm so as to preferably substantially fill the entire space across the counterbore in the plane of the projection or to present only slight resistance with the outer wall of the recess while being inserted therewithin. The diaphragm is thus preserved substantially in its original or previous size except for the addition of the bead. In this manner the diaphragm is always placed in a substantially perfectly centered position within the relief or counterbore. The peripheral space between the main part of the diaphragm and outer wall of the recess allows for expansion or spreading of the diaphragm in this direction after limited clamping is effected which performs a relief function for the diaphragm. It prevents undue inward distortion and consequent buckling resulting in failure of the valve to open under low inlet pressure and the production of the objectionable chatter or dynamic vibrations referred to above.

The use of the peripheral bead and the space between the main part of the diaphragm and outer wall of the recess prior to attachment of the bonnet serves another important purpose. By virtue of this arrangement, when the bonnet is secured to the body portion with the limited clamping of the diaphragm, the squeezing and spreading imposed on the latter when so clamped is effective to press the continuous peripheral bead into tight fluid sealed engagement with the outer wall of the recess in a highly loaded substantially limited area or line bearing contact. Where the diaphragm is the only member within the recess or counterbore the sealing between the bead and wall is an additional and final means of insuring fluid tight engagement between the diaphragm and casing. Where a baffle member is also received within the recess as shown in the preferred form illustrated, the engagement between the extending bead and recess wall becoms essentially the primary sealing means of the diaphragm. Except for the high unit loading, limited area of contact afforded by the bead and peripheral relief arrangement of the diaphragm of the present invention, effective sealing could not be had under the relatively low or controlled clamping of the diaphragm necessary to avoid buckling and distorting with the attendant dangers of chatter and failure of low pressure opening of the valve. For instance, considerable difficulty has been experienced in the matter of leakage where the diaphragm fills the entire recess space and reliance is had in sealing on contact between the entire area of the wall and outer periphery of the diaphragm.

Other objections and advantages will become more readily apparent upon proceeding with the specification read in the light of the accompanying drawing in which:

Fig. 1 is a fragmentary sectional assembly view of a preferred embodiment of my invention, and Fig. 2 is a sectional view showing the body portion of the valve with the flexible diaphragm of this invention received therewithin prior to securement of the bonnet to the body.

Referring in detail to the drawing figures, the numeral 1 designates a hollow valve casing of a supply valve as used in water closet flush tanks or the like, which casing comprises a body portion 2 and a bonnet or cap member 3. The valve casing is mounted on the usual inlet supply tube 4 as shown, the casing also having a ported seat member 5 threadedly received on the same threading connecting the supply tube. The casing, as mentioned, is hollow, being provided with the chamber 7 within which the ported seat member extends.

The casing is further relieved at or along the parting line between the bonnet and body portions for reception of a flexible, imperforate diaphragm member 9. In the illustrated form the relief takes the form of a counterbore 10 wholly contained within the body portion of the valve as shown in the drawing. This relief or counterbore is provided with a continuous annular outer wall 11 and a flat bottom surface or shoulder 12. The lower surface of the bonnet forms the top of the relief, facing in spaced, parallel relation the shoulder 12 and coextensive therewith. In the form shown, the bonnet is also relieved at 13 to provide an upper chamber in cooperation or continuation with the lower chamber or portion below the diaphragm, thus constituting the hollow interior of the casing. The bonnet further contains a central bore 14 for reception of the cylindrical plunger 15 for depression of the diaphragm into engagement with the ported seat member 5 in the closed valve position. This plunger member is depressed or actuated by rotation of the lever 17 pivotally supported at 20, this member being moved by the action of the tank water acting on the usual float (not shown) in the well known manner.

The body portion 2 is also provided with a side cavity 21 leading into the usual outlet or hush tube 22 and refill tube (not shown). The casing or more particularly the body portion thereof is thus seen to be provided with an inlet and outlet for the flow therethrough of supply water. It is apparent that the diaphragm 9, which is preferably constructed of rubber or the like, separates the hollow interior of the casing into the upper and lower chambers previously noted. Considering the diaphragm more specifically and with reference to Fig. 2 prior to assembly or mounting of the member within the valve casing, it is essentially of flat disc-like form as apparent from the figure but contains a pair of oppositely disposed annular grooves 24 and 25 producing a flat web portion 26 therebetween. These annular grooves are intermediate the central seat contactable portion 27 and the outer periphery of the diaphragm. It should be noted that each of the annular grooves are of substantially the same depth and extent and that the outer edges of the same terminate opposite the inner surface of the hollow casing above and below the recess 10. The underlying purpose of this stepped form of diaphragm is set forth in copending application Serial No. 375,179, filed August 14, 1953. Briefly, however, this arrangement contributes to a better performing valve having less tendency to produce water noise and chatter.

Also contained within the annular recess or counterbore 10 is a thin, preferable metallic baffle plate 29 supported on the flat annular shoulder 12 and having a downwardly directed inner portion 30 terminating in a central opening 31 for the passage of the diaphragm therethrough and into contact with the ported seat member 5. This baffle member is preferably a perforated sheet containing relatively closely spaced apertures of relatively small diameter, the proportion of the solid part of the baffle plate to the open area depending on the particular service and pressure conditions to which the valve is put. This member also helps in the matter of water noise and chatter.

Continuing to look at the diaphragm in detail, it should be noted from Fig. 2 that prior to mounting or securement of the bonnet to the body portion the diaphragm member is relatively loosely received within the counterbore 10, providing a certain substantial space indicated at 33 between the outer peripheral wall 34 of the diaphragm and the outer wall 11 of the counterbore. It should also be noted that the thickness or height of the diaphragm member is somewhat greater than the depth of the recess or counterbore minus the thickness of the baffle member 29 received therewithin. The diaphragm member further and according to the illustrated form of the invention includes a continuous outwardly projecting annular bead portion 35 medially positioned on the outer wall 34 of the diaphragm and making at least light contact with the outer wall of the recess in the Fig. 2 relation of parts.

When the bonnet member 3 is placed over the body portion and supported diaphragm and fastened securely to the body by means of the screws 37 the diaphragm will undergo a certain amount of squeezing which will cause expansion or spreading of the same both outwardly and inwardly in a horizontal direction. Referring to Fig. 1, which shows the assembled relation, the amount of space previously designated 33 will now have been substantially decreased as well as the taking place of a certain inward movement of the rubber rim portion 38 of the diaphragm. It should be evident, however, that by the provision of the annular space 33 into which the outward expansion of the diaphragm takes place a sort of relief is provided which prevents any excessive inward expansion of the rim portion in the opposite direction. For instance, if the relief 33 were not present the entire expansion or spreading of the diaphragm would take an inward direction resulting in considerable buckling or distortion of the non-supported portion of the diaphragm. Experience has shown that such buckling and distortion causes failure of the valve to open under low inlet pressure conditions because of the same being depressed at the center so as to prevent or interfere with the inflow of supply water. It is also found that such buckling tends to produce an unstable condition facilitating chatter or dynamic vibrations.

It should therefore be apparent that the provision of the annular relief or space 33 is most significant in that it eliminates the effect of buckling with its attendant failure of low pressure opening and chatter promoting tendencies by providing space into which the diaphragm can expand. The width of the bead and consequently the size of the relief may of course vary according to the amount of outward expansion or spreading of the diaphragm to be accommodated. It should be noted, however, that the depth of the relief 10 minus the thickness of the baffle plate 29 is preferably only slightly less than the thickness of the rim portion of the diaphragm so that only a limited and controlled amount of clamping and consequent squeezing or reduction in height of the diaphragm takes place. In this way the limited or controlled spreading of the rim portion of the diaphragm under the clamping action is largely relieved within the peripheral space 33 and does not exert itself as any undue force tending to cause the objectionable distortion and buckling.

The presence of the peripheral bead or projection 35 and the annular relief 33 is also of great significance in another respect. By virtue of this arrangement, when the bonnet is secured to the body portion with the limited clamping of the diaphragm, the squeezing and spreading imposed on the latter when so clamped is effective to press the continuous peripheral bead into tight fluid sealed engagement with the outer wall 11 of the recess or counterbore 10 of the body portion is a highly loaded or force concentrated, limited area or substantially line bearing contact. The squeezing of the diaphragm resulting from the clamping thereof, is therefore utilized in effecting the fluid tight seal around its periphery.

It should be remembered in this connection that with the baffle member 29 in the preferred form there is a tendency for leakage to occur between the diaphragm and shoulder 12 of the recess and consequently, the projection 35 is the means of sealing primarily depended on for fluid tight sealing between the diaphragm and body. It should also be noted that line bearing or concentrated area contact is much more effective in sealing than extensive engagement over a broad area. In the latter regard and as previously noted, considerable difficulty was experienced in the matter of leakage where the diaphragm filled the entire recess and reliance was had in sealing on contact between the entire area of the wall and outer periphery of the diaphragm (assuming the use of a baffle member). Of course, buckling difficulties were also present in this form inasmuch as there was no peripheral relief present into which outward expansion of the diaphragm could take place. Also, even with the peripheral relief the extent of clamping of the diaphragm must be predeterminately limited in order to prevent buckling.

Accordingly and in view of the above, except for the relatively highly loaded, limited area of contact afforded by the bead and peripheral relief arrangement of the diaphragm of the present invention, effective sealing could not be had under the relatively low or controlled clamping of the diaphragm necessary to avoid buckling and distortion with the attendant dangers of chatter promotion and failure of low pressure opening of the valve.

Also of importance and derived from the presence of the peripheral bead 35 is the substantially perfect centering afforded the diaphragm member within the relieved portion of the body during assembly which prevents the off center positioning mentioned in the preamble, which lead to chatter and buckling distortion. The latter was of course the result of uneven peripheral space into which the diaphragm could spread or expand outwardly under the clamping load, thus producing uneven and excessive inward spreading of the diaphragm rim 38 opposite the point where little or no outer space was present to produce the warping or buckling of the interior portion of the diaphragm.

It should also be noted that the peripheral bead 35 prior to the mounting of the bonnet is of rounded or essentially semi-circular configuration in cross section. This is of importance in facilitating placement of the diaphragm within the relief 10 inasmuch as the lower part of the rounded surface tends to permit the diaphragm to cam into or drop easily into place within the recess.

It should of course be appreciated that the peripheral bead of this invention has another important advantage in that it compensates for manufacturing tolerances which cause variations in the size of the bore in the body and also the outside diameter of the rubber diaphragm.

It should also be understood that forms and modifications can be had other than the form shown and therefore, the invention should be limited only by the terms of the appended claims read in the broad light of the inventive concept.

I claim:

1. A valve comprising in combination a hollow casing having a ported seat, said casing comprising a body portion having the ported seat and a bonnet secured to the body portion, said casing being relieved at the juncture of the body portion and bonnet thereof from the hollow interior of the casing towards the outside so as to present wall means defining the outer limits of the relief, a flexible impervious diaphragm of material such as rubber extending across the inside of said hollow casing and received within said relief thereof, means extending through said bonnet for depressing said diaphragm into contact with said ported seat, said diaphragm having outer peripheral wall means and being of dimensions across said peripheral wall means prior to mounting of the diaphragm within the casing less than the dimensions across said relief of the casing, said diaphragm having continuous peripheral extending means along and outwardly of the peripheral wall means thereof prior to mounting of the diaphragm, said peripheral extending means prior to mounting of the diaphragm being substantially of uniform size around the diaphragm, the dimensions of said diaphragm across said peripheral extending means prior to mounting being at least approximately those across said relief whereby centering of the main part of the diaphragm within said relief during mounting is afforded, the difference between the dimensions across said wall means of the diaphragm prior to mounting and those across the relief providiing for expansion of the diaphragm outwardly under clamping pressure when the bonnet is secured to the body portion in the course of assembly of the valve and mounting of the diaphragm, said bonnet and body portions each having surface means providing opposed surfaces defining sides of said relief, said bonnet and body portion each having an annular surface outwardly of the relief abutting each other in the assembled relation of the valve whereby to fix the space between said surface means at opposite sides of the relief in the assembled relation of the valve, the spacing of said surface means at opposite sides of the relief in the assembled relation of the valve being predeterminately less than that of the opposite surfaces of the diaphragm, prior to assembly, within the relief and engaging said surface means at opposite sides of the relief in the assembled relation of the valve, the spacing of said opposite surfaces of the diaphragm within the relief in the assembled relation of the valve being sufficiently greater, prior to assembly, than the spacing of said surface means at opposite sides of the relief to provide for outward expansion of said diaphragm and pressing of said peripheral extending means thereof against said wall means of the relief so as to provide limited area fluid sealing contact therewith but insufficient to cause excessive inward expansion of the diaphragm resulting in appreciable buckling thereof.

2. The subject matter of claim 1, said diaphragm having a relatively thick central portion for engagement with the ported seat in the closed position and a portion of reduced thickness outwardly thereof, said portion of reduced thickness extending at least to the relief of said casing.

3. The subject matter of claim 2 including a baffle member extending within said relief of the casing, said baffle member being on the side of the diaphragm facing the ported seat and engaged by said diaphragm within the recess, the surface of the baffle member engaged by said diaphragm being one of said surface means at opposite sides of the relief.

4. A valve comprising in combination a hollow casing having a ported seat, said casing comprising a body portion having the ported seat and a bonnet secured to the body portion, said casing being relieved at the juncture of the body portion and bonnet thereof from the hollow interior of the casing towards the outside so as to present wall means defining the outer limits of the relief and spaced opposed surface means forming the sides of the relief, a flexible impervious diaphragm of material such as rubber extending across the inside of said hollow casing and received within said relief thereof, means extending through said bonnet for depressing said diaphragm into contact with said ported seat, said diaphragm having oppositely facing back to back annular grooves between the center seat contactible portion and outer limits of the member, the grooves being of substantially the same size and of uniform size and depth throughout their extent, said grooves being of substantial extent in the direction towards the center of the diaphragm whereby to produce a reduced flexible web portion intermediate the center portion and outer limits, said grooves in the mounted relation of the diaphragm extending outwardly at least as far as near the unrelieved portion of the casing adjacent the relief within which the diaphragm is received, a baffle member extending within said relief of the casing, said baffle member being on the side of the diaphragm facing the ported seat and being interposed within the relief of the casing between the diaphragm and one of the spaced opposed surface means of the relief, said diaphragm having outer peripheral wall means and being of dimensions across said wall means prior to mounting of the diaphragm within the casing less than the dimensions across said relief of the casing, said diaphragm having continuous peripheral extending means along and outwardly of the peripheral wall means thereof prior to mounting of the diaphragm, said peripheral extending means prior to mounting of the diaphragm being substantially of uniform size around the diaphragm, the dimensions of said diaphragm across said peripheral extending means prior to mounting being at least approximately those across said relief whereby centering of the main part of the diaphragm within said relief during mounting is afforded, the difference between the dimensions across said wall means of the diaphragm prior to mounting and those across the relief providing for expansion of the diaphragm outwardly under clamping pressure when the bonnet is secured to the body portion in the course of assembly of the valve and mounting of the diaphragm, said bonnet and body portion each having an annular surface outwardly of the relief abutting each other in the assembled relation of the valve whereby to fix the space between the surface of the baffle member engaged by said diaphragm and the one of the spaced opposed surface means of the relief on the other side of the diaphragm, the spacing of said surface of the baffle member engaged by said diaphragm and said one of the spaced opposed surface means of the relief to each other being predeterminately less than that of the opposite surfaces of the diaphragm, prior to assembly, within the relief and engaging said baffle member and said one of the spaced opposed surface means of the relief in the assembled relation of the valve, the spacing of said opposite surfaces of the diaphragm within the relief in the assembled relation of the valve being sufficiently greater, prior to assembly, than the spacing of said surface of the baffle member engaged by said diaphragm and said one of the spaced opposed surface means of the relief to each other to provide for outward expansion of said diaphragm and pressing of said peripheral extending means thereof against said wall means of the relief so as to provide limited area fluid sealing contact therewith but insufficient to cause excessive inward expansion of the diaphragm resulting in appreciable buckling thereof.

5. The subject matter of claim 4, said continuous peripheral extending means of the diaphragm consisting of a sole medially positioned bead around the periphery of the diaphragm.

References Cited in the file of this patent

UNITED STATES PATENTS

| | | |
|---|---|---|
| 2,160,757 | Schulhoff | May 30, 1939 |
| 2,684,829 | McFarland | July 27, 1954 |

FOREIGN PATENTS

| | | |
|---|---|---|
| 232,195 | Switzerland | of 1944 |